(12) United States Patent
Takura et al.

(10) Patent No.: US 12,075,000 B2
(45) Date of Patent: Aug. 27, 2024

(54) APPLICATION EXTENSION PROGRAM, INFORMATION PROCESSING APPARATUS, AND METHOD

(71) Applicant: Sony Group Corporation, Tokyo (JP)

(72) Inventors: Kento Takura, Tokyo (JP); Motoki Sasaki, Tokyo (JP); Kumiko Tsukahara, Tokyo (JP); Fumihiko Nishio, Tokyo (JP); Hyumin Seul, Tokyo (JP); Sho Kobayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 186 days.

(21) Appl. No.: 17/638,186

(22) PCT Filed: Sep. 5, 2019

(86) PCT No.: PCT/JP2019/035068
§ 371 (c)(1),
(2) Date: Feb. 25, 2022

(87) PCT Pub. No.: WO2021/044601
PCT Pub. Date: Mar. 11, 2021

(65) Prior Publication Data
US 2022/0329686 A1 Oct. 13, 2022

(51) Int. Cl.
H04W 4/02 (2018.01)
G06F 3/0482 (2013.01)
(Continued)

(52) U.S. Cl.
CPC ...... H04M 1/72469 (2021.01); G06F 3/0482 (2013.01); G06F 3/0486 (2013.01);
(Continued)

(58) Field of Classification Search
CPC ......... H04M 1/72469; H04M 1/72403; H04M 2201/42; G06F 3/0482; G06F 3/0486; G06F 3/0488
See application file for complete search history.

(56) References Cited

U.S. PATENT DOCUMENTS 9,883,035 B1 * 1/2018 Kulkarni ................. G06F 18/22
2008/0282160 A1 * 11/2008 Tonnison ................ G06F 9/451
715/785
(Continued)

FOREIGN PATENT DOCUMENTS

CN 104423771 A 3/2015
CN 105359078 A 2/2016
(Continued)

OTHER PUBLICATIONS

International Search Report and Written Opinion mailed on Oct. 15, 2019, received for PCT Application PCT/JP2019/035068, Filed on Sep. 5, 2019, 10 pages including English Translation.

Primary Examiner — Moustapha Diaby
(74) Attorney, Agent, or Firm — XSENSUS LLP

(57) ABSTRACT

A program causes an information processing apparatus to activate a second application that provides an extended function to a first application, superimpose and display a menu of the second application on the first application in response to a predetermined operation at a predetermined position on a screen where the first application is displayed and the second application is not displayed, and execute processing corresponding to the extended function selected from the menu.

12 Claims, 17 Drawing Sheets

(51) Int. Cl.
 *G06F 3/0486* (2013.01)
 *G06F 3/0488* (2022.01)
 *G06Q 30/02* (2023.01)
 *H04M 1/72403* (2021.01)
 *H04M 1/72469* (2021.01)
 *H04W 8/18* (2009.01)

(52) U.S. Cl.
 CPC ...... *G06F 3/0488* (2013.01); *H04M 1/72403* (2021.01); *H04M 2201/42* (2013.01)

(56) References Cited

U.S. PATENT DOCUMENTS

| | | |
|---|---|---|
| 2012/0249853 A1 | 10/2012 | Krolczyk |
| 2013/0194215 A1 | 8/2013 | Toida |
| 2015/0007024 A1* | 1/2015 | Jeong ................ H04N 1/32363 715/277 |
| 2015/0049031 A1 | 2/2015 | Maruoka et al. |
| 2016/0370958 A1 | 12/2016 | Tsuji et al. |
| 2019/0082097 A1 | 3/2019 | Manzari |
| 2019/0082108 A1 | 3/2019 | Kinoshita |
| 2020/0213438 A1* | 7/2020 | Liu ........................ G06F 3/0482 |
| 2021/0286491 A1* | 9/2021 | Duan ..................... G06F 1/1626 |

FOREIGN PATENT DOCUMENTS

| | | |
|---|---|---|
| EP | 2840474 A1 | 2/2015 |
| EP | 3021204 A1 | 5/2016 |
| JP | 2015-38718 A | 2/2015 |
| JP | 2017-134632 A | 8/2017 |
| JP | 2017-174029 A | 9/2017 |
| JP | 2017-188833 A | 10/2017 |
| KR | 10-2015-0020987 A | 2/2015 |
| WO | 2015/005146 A1 | 1/2015 |

* cited by examiner

FIG.10
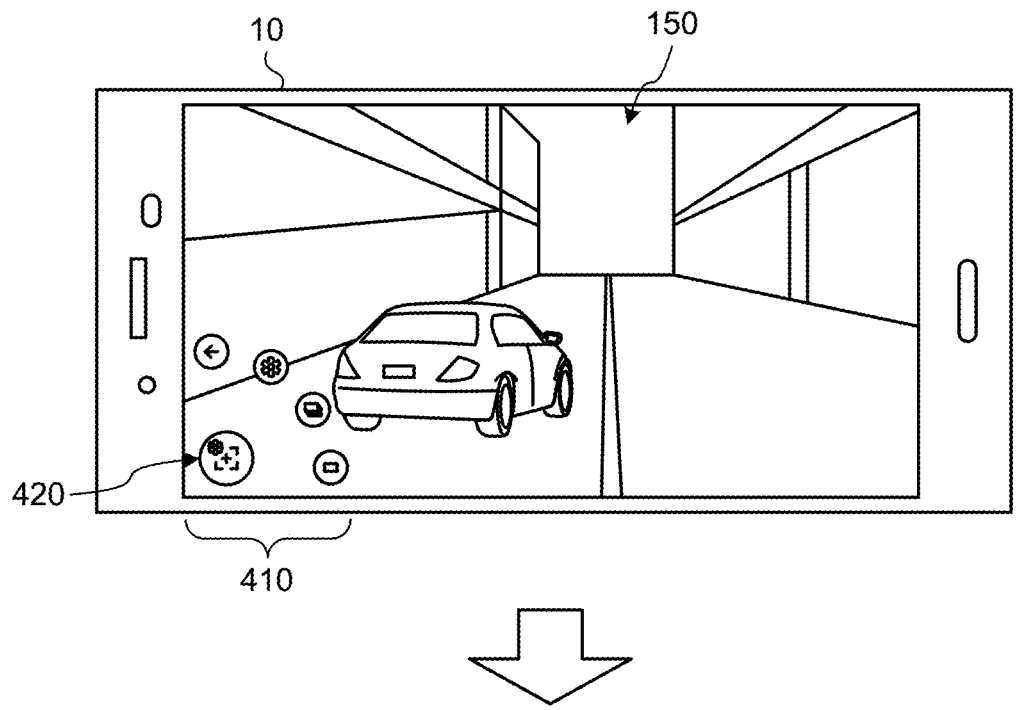
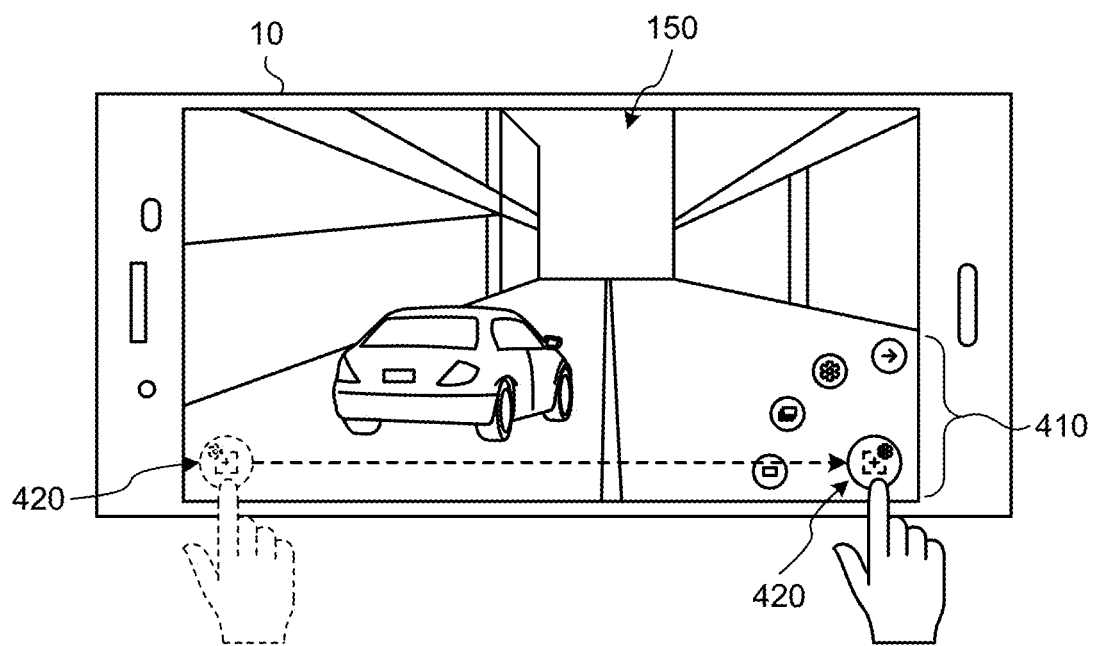

APPLICATION EXTENSION PROGRAM, INFORMATION PROCESSING APPARATUS, AND METHOD

CROSS-REFERENCE TO RELATED APPLICATION

The present application is based on PCT filing PCT/JP2019/035068, filed Sep. 5, 2019, the entire contents of which is incorporated herein by reference.

FIELD

The present disclosure relates to an application extension program, an information processing apparatus, and a method.

BACKGROUND

In recent years, a user installs various applications on a terminal such as a personal computer or a smartphone to obtain a user experience using not only one application but also a plurality of applications in combination.

For example, the user takes a video or an image of a play screen of a gaming application with a camera application. The taken video or image is processed by another application, and distributed online or published on a website via a web service or other applications. In this way, the user tries to obtain a new user experience by using another application so as to extend one application.

CITATION LIST

Patent Literature

Patent Literature 1: JP 2017-188833 A

SUMMARY

Technical Problem

When other applications are used to extend one application, it is important not to interfere with display and operation of each other's applications as much as possible in order to obtain a comfortable user experience. For example, during play of a gaming application, if a user interface (UI) of a camera application interferes with the play, the comfortable user experience is significantly impaired. On the other hand, if it becomes difficult to shoot with the camera application in order to prioritize the play of the gaming application, it is possible to miss the shooting at the decisive moment of the play screen. Note that such a problem is not limited to the case of using a specific application such as a gaming application or a camera application, and is a problem that similarly occurs when the user uses various applications in combination.

Therefore, the present disclosure proposes an application extension program, an information processing apparatus, and a method capable of providing a more comfortable user experience without disturbing the display and operation of each other's applications as much as possible when using other applications so as to extend one application.

Solution to Problem

The present disclosure provides a program causing an information processing apparatus to: activate a second application that provides an extended function to a first application; superimpose and display a menu of the second application on the first application in response to a predetermined operation at a predetermined position on a screen where the first application is displayed and the second application is not displayed; and execute processing corresponding to the extended function selected from the menu.

The present disclosure provides an information processing apparatus comprising a control unit that: activates a second application that provides an extended function to a first application; superimposes and displays a menu of the second application on the first application in response to a predetermined operation at a predetermined position on a screen where the first application is displayed and the second application is not displayed; and executes processing corresponding to the extended function selected from the menu.

The present disclosure provides a method in which an information processing apparatus: activates a second application that provides an extended function to a first application; superimposes and displays a menu of the second application on the first application in response to a predetermined operation at a predetermined position on a screen where the first application is displayed and the second application is not displayed; and executes processing corresponding to the extended function selected from the menu.

BRIEF DESCRIPTION OF DRAWINGS

FIG. 10 is a diagram illustrating an example of an operation related to a change of a menu display position of a screenshot function according to the embodiment.

DESCRIPTION OF EMBODIMENTS

Hereinafter, embodiments of the present disclosure will be described in detail with reference to the drawings. Note that, in the present specification and the drawings, substantially the same parts are denoted by the same reference signs, and a redundant description will be omitted.

Note that the description will be given in the following order.

1. Embodiment
1.1. Functional configuration example
1.2. Functional Details
2. Modification of embodiment
3. Hardware configuration example
4. Summary

1. Embodiment 1.1. Functional Configuration Example

First, a functional configuration example of an information processing apparatus 10 according to the present embodiment will be described. The information processing apparatus 10 may be a mobile terminal such as a smartphone or a tablet personal computer (PC) capable of executing various applications, or may be a stationary terminal installed at user's home, office, or the like.

Figure 1:
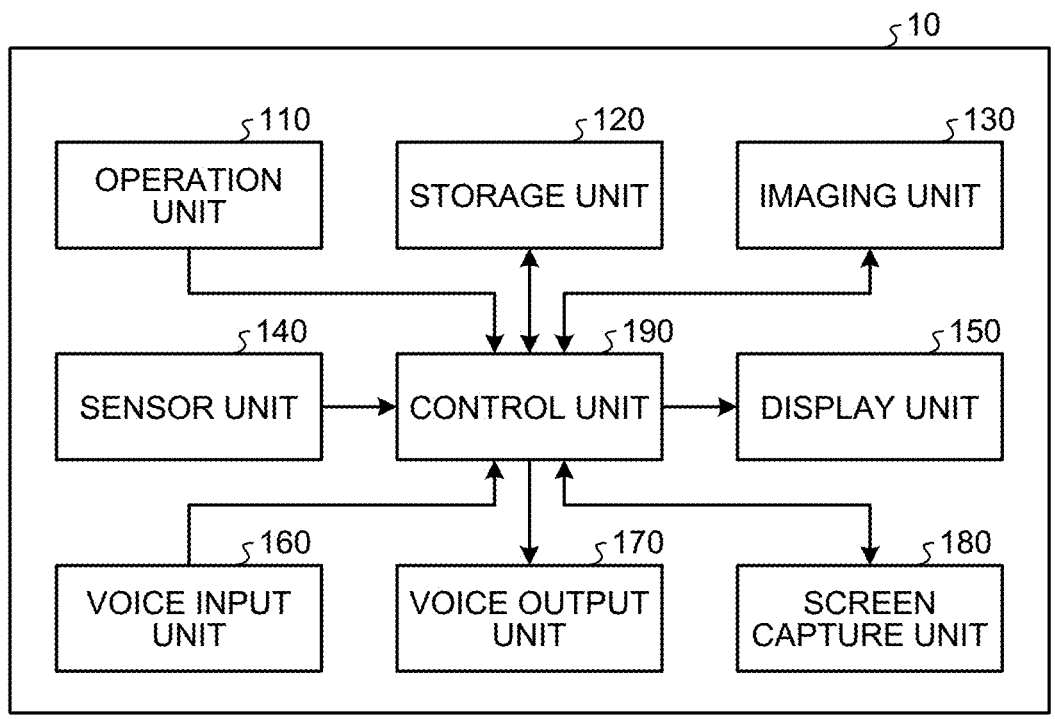
FIG. 1 is a block diagram illustrating a functional configuration example of an information processing apparatus 10 according to the present embodiment.

FIG. 1 is a block diagram illustrating a functional configuration example of the information processing apparatus 10 according to the present embodiment. As illustrated in FIG. 1, the information processing apparatus 10 according to the present embodiment includes an operation unit 110, a storage unit 120, an imaging unit 130, a sensor unit 140, a display unit 150, a voice input unit 160, a voice output unit 170, a screen capture unit 180, and a control unit 190.

(Operation Unit 110)

The operation unit 110 according to the present embodiment detects various operations by the user, such as a device operation for an application. Examples of the above-described device operation include a touch operation and insertion of an earphone terminal into the information processing apparatus 10. Here, the touch operation refers to various touch operations on the display unit 150, such as tapping, double tapping, swiping, and pinching. In addition, the touch operation includes an operation of bringing an object such as a finger close to the display unit 150, for example. For this purpose, the operation unit 110 according to the present embodiment includes, for example, a touch panel, a button, a keyboard, a mouse, a proximity sensor, and the like. The operation unit 110 according to the present embodiment inputs information regarding the detected operation of the user to the control unit 190.

(Storage Unit 120)

The storage unit 120 according to the present embodiment is a storage area for temporarily or permanently storing various programs and data. For example, the storage unit 120 may store programs and data for the information processing apparatus 10 to execute various functions. As a specific example, the storage unit 120 may store a program for executing various applications, management data for managing various settings, and the like. Of course, the above is merely an example, and the type of data stored in the storage unit 120 is not particularly limited.

(Imaging Unit 130)

The imaging unit 130 according to the present embodiment images, for example, a face or the like of the user who operates the information processing apparatus 10 on the basis of the control by the control unit 190. For this purpose, the imaging unit 130 according to the present embodiment includes an imaging element. A smartphone, which is an example of the information processing apparatus 10, includes a front camera for imaging a user's face or the like on a side of the display unit 150 and a main camera for imaging a landscape or the like on a back side of the display unit 150, and in the present embodiment, imaging by the front camera is controlled as an example.

(Sensor Unit 140)

The sensor unit 140 according to the present embodiment has a function of collecting sensor information regarding user's behavior using various sensors. The sensor unit 140 includes, for example, an acceleration sensor, a gyro sensor, a geomagnetic sensor, a vibration sensor, a global navigation satellite system (GNSS) signal reception device, and the like. For example, the sensor unit 140 detects that the user holds the information processing apparatus 10 sideways by using a gyro sensor, and inputs the detected information to the control unit 190.

(Display Unit 150)

The display unit 150 according to the present embodiment displays various types of visual information on the basis of control by the control unit 190. The display unit 150 according to the present embodiment may display, for example, an image, a character, or the like related to an application. For this purpose, the display unit 150 according to the present embodiment includes various display devices such as a liquid crystal display (LCD) device and an organic light emitting diode (OLED) display device. Furthermore, the display unit 150 can also superimpose and display a UI of another application on a layer higher than a screen of the application being displayed.

(Voice Input Unit 160)

The voice input unit 160 according to the present embodiment collects a voice or the like uttered by the user on the basis of control by the control unit 190. For this purpose, the voice input unit 160 according to the present embodiment includes a microphone and the like.

(Voice Output Unit 170)

The voice output unit 170 according to the present embodiment outputs various voices. The voice output unit 170 according to the present embodiment outputs, for example, a voice or a sound according to the situation of an application on the basis of control by the control unit 190. For this purpose, the voice output unit 170 according to the present embodiment includes a speaker and an amplifier.

The screen capture unit 180 according to the present embodiment captures a screenshot (SS) and a video of a screen displayed on the display unit 150 under control of the control unit 190, and stores the screenshot and video in the storage unit 120.

(Control Unit 190)

The control unit 190 according to the present embodiment controls each component included in the information processing apparatus 10. Furthermore, one of the features of the control unit 190 according to the present embodiment is to control function extension to an application. Note that the function extension to the application is performed by another application (Here, in order to distinguish between an application for which the function extension is performed and another application that performs the function extension, the applications are referred to as an "external application" (an example of a first application) and an "extension application" (an example of a second application), respectively.). When performing the function extension, the control unit 190 activates the extension application in addition to the external application, and simultaneously controls both the applications. Details of the functions of the control unit 190 according to the present embodiment will be described later.

The functional configuration example of the information processing apparatus 10 according to the present embodiment has been described above. Note that the above-described functional configuration described with reference to FIG. 1 is merely an example, and the functional configuration of the information processing apparatus 10 according to the present embodiment are not limited to such an example. For example, the information processing apparatus 10 does not necessarily need to include all of the configurations illustrated in FIG. 1, and can include each configuration such as the voice input unit 160 in another apparatus different from the information processing apparatus 10. The functional configuration of the information processing apparatus 10 according to the present embodiment can be flexibly modified according to specifications and operations.

In addition, the function of each component may be performed by reading a control program that describes a processing procedure for an arithmetic device such as a central processing unit (CPU) to realize these functions from a storage medium such as a read only memory (ROM) or a random access memory (RAM) storing the control program, and interpreting and executing the program. Therefore, it is possible to appropriately change the configuration to be used according to a technical level at the time of carrying out the present embodiment. Furthermore, an example of a hardware configuration of the information processing apparatus 10 will be described later.

<<1.1. Functional Details>>

Next, functions of the information processing apparatus 10 according to the present embodiment will be described in detail. One of the features of the control unit 190 of the information processing apparatus 10 according to the present embodiment is to control the extension application that provides an extended function to various external applications. The external application is, for example, a gaming application. However, the external application is not limited to the gaming application, and includes various applications installed in the information processing apparatus 10 and used by the user, such as a drawing application, an editing application, and a music application for viewing a video, music, and the like.

According to the extension application according to the present embodiment, it is possible to easily provide the extended function to the various external applications without editing a source code or the like. Furthermore, when the extended function is provided, the extension application can operate so as not to interfere with a user operation on the external application or the OS and a behavior of the external application.

Figure 2:
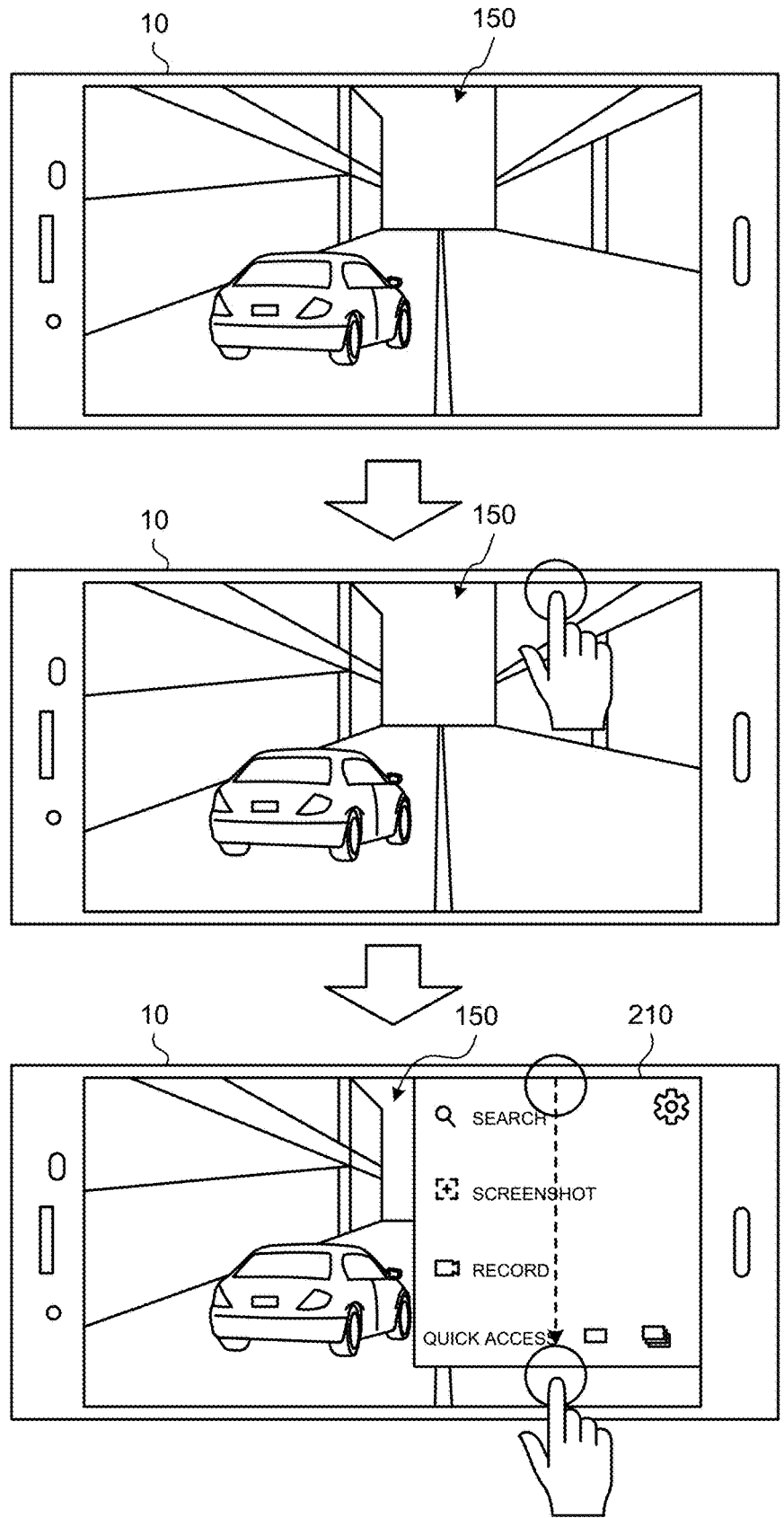
FIG. 2 is a diagram illustrating an example of an operation related to menu display of an extension application according to the embodiment.

FIG. 2 is a diagram illustrating an example of an operation related to menu display of the extension application according to the present embodiment. In FIG. 2, when the user turns the information processing apparatus 10 sideways, the sensor unit 140 detects this, and the screen on the display unit 150 is displayed as a horizontal screen by the control unit 190.

An upper part of FIG. 2 illustrates a state in which the control unit 190 has already activated the external application (here, the gaming application) and has caused the display unit 150 to display the screen of the external application in a full screen. In the upper part of FIG. 2, the user is playing the external application but is not using the extension application.

The display unit 150 in the upper part of FIG. 2 does not display any UI of the extension application that performs function extension with respect to the external application. The extension application may be activated by the control unit 190 upon detection of activation of the external application, or may be activated upon detection of an arbitrary operation during activation of the external application. The arbitrary operation is, for example, a user operation detected by the operation unit 110 or the sensor unit 140, a voice operation recognized by the voice input unit 160, or the like. Furthermore, the extension application may be automatically activated together with the activation of the OS of the information processing apparatus 10. Alternatively, the extension application may be activated by pressing an icon for the extension application displayed on the display unit 150 by a user operation or the like.

As described above, there is a case where the extension application is also being activated while the external application is being activated, but when the user is not using the extension application, in principle, the UI of the extension application is not displayed. Note that a logo or the like may be displayed when the extension application is activated, but for example, control is performed by the control unit 190 such that the logo automatically disappears after a certain period of time. As a result, when the user is not using the extension application, the extension application can operate so as not to interfere with the user operation on the external application or the OS and the behavior of the external application.

A middle part of FIG. 2 illustrates a state in which the user intends to perform a touch operation on the display unit 150 in order to use the extension application. Subsequently, a lower part of FIG. 2 illustrates a state in which a menu 210 of the extension application is displayed to be superimposed on the external application when the user performs a swipe operation from a screen end of the display unit 150.

The menu 210 is, for example, a pull-down menu expanded from the screen end in response to the movement of the swipe operation. Note that, although details will be described later, the menu 210 is displayed by a predetermined operation at a predetermined position of the display unit 150. Therefore, strictly speaking, the operation unit 110 detects a touch operation on the display unit 150, the detected operation and position (screen coordinates) are sent to the control unit 190, and the control unit 190 determines whether or not to display the menu 210. In a case where the condition for displaying the menu 210 (a predetermined operation at a predetermined position) is satisfied, the control unit 190 causes the display unit 150 to display the menu 210.

Note that the touch operation for displaying the menu 210 is not limited to the swipe, and may be a tap, a double tap, a pinch, or the like. Furthermore, the display position of the menu 210 is not limited to an upper right portion of the display unit 150 as illustrated in the lower part of FIG. 2, and may be various positions on the display unit 150. Moreover, the display position of the menu 210 can be freely changed by the user although details will be described later.

Figure 3:
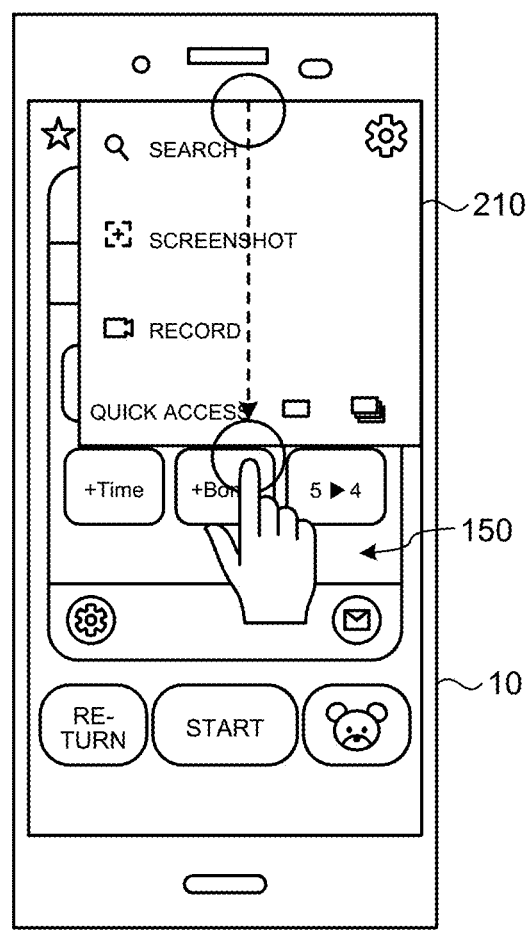
FIG. 3 is a diagram illustrating an example of an operation related to menu display of an extension application according to the embodiment.

FIG. 3 is a diagram illustrating an example of an operation related to menu display of the extension application according to the present embodiment. In FIG. 3, an external application for a vertical screen is displayed on the display unit 150. Also in the case of the vertical screen, similarly to the horizontal screen in FIG. 2, when the user performs a swipe operation on the display unit 150, the menu 210 of the extension application is superimposed and displayed on the external application.

Figure 4:
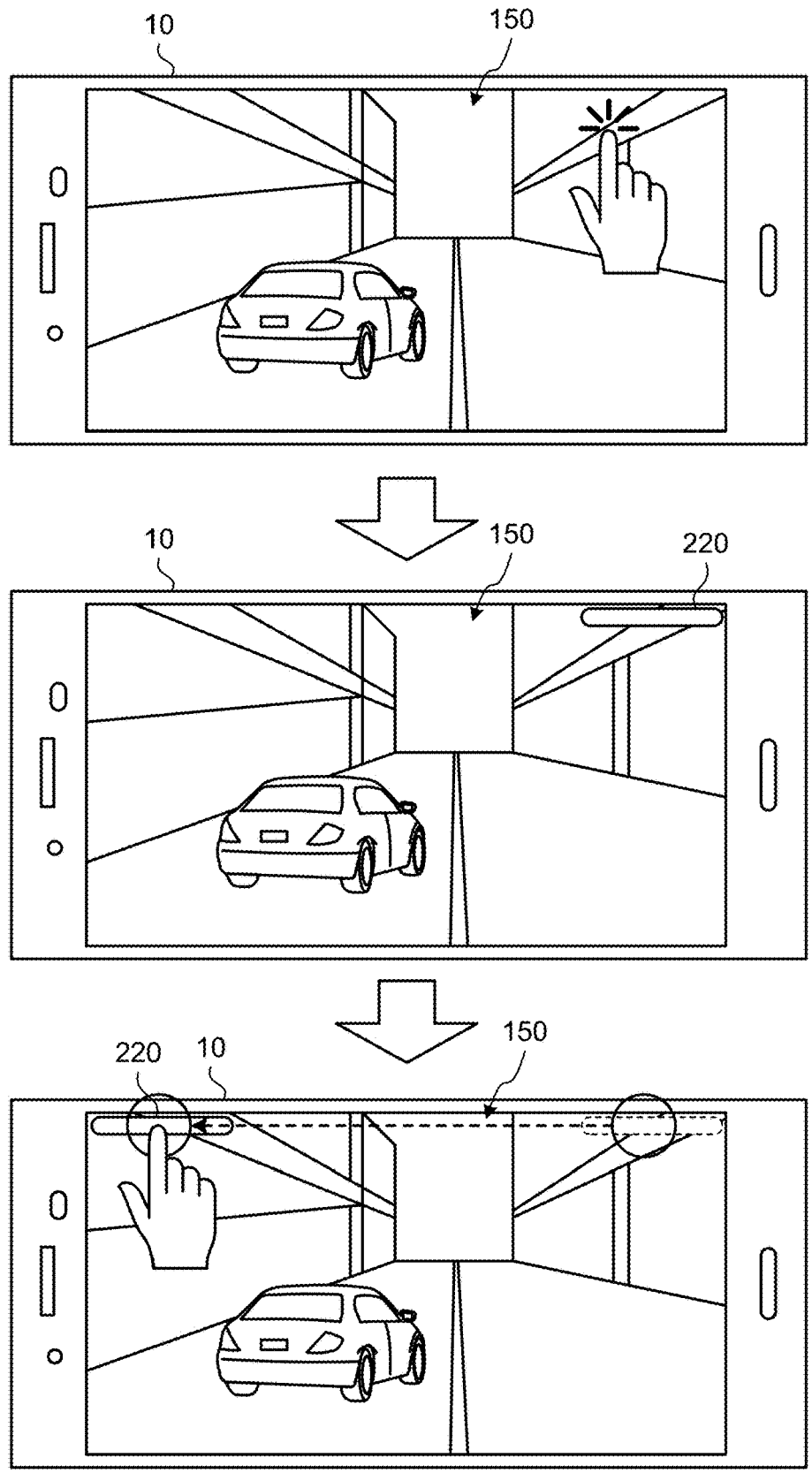
FIG. 4 is a diagram illustrating an example of an operation related to a change of a menu display position according to the embodiment.

FIG. 4 is a diagram illustrating an example of an operation related to a change of a menu display position according to the present embodiment. If the display position of the menu 210 of the extension application is fixed, there is a case where a user operation on the external application or the OS and a behavior of the external application are significantly hindered. For example, there is a case where the menu 210 is superimposed and displayed on an operation button or an icon of the external application, a display portion of the external application that the user always wants to see, or the like. Therefore, the display position of the menu 210 of the extension application is controlled by the control unit 190 so as to be freely changed by the user.

An upper part of FIG. 4 illustrates a state in which the user taps a predetermined position of the display unit 150 in order to change the display position of the menu 210. The predetermined position here is, for example, a predetermined area near a position (middle part of FIG. 2) at which a swipe operation is started in order to expand the menu 210 of FIG. 2.

A middle part of FIG. 4 illustrates a state in which a menu bar 220 of the extension application is displayed by a tap operation (the upper part of FIG. 4) on the display unit 150. Note that the touch operation for displaying the menu bar 220 is not limited to a tap. In addition, since the menu bar 220 is superimposed and displayed on the screen of the external application, it is desirable that the menu bar has a shape, a color, a size, and a transmittance that do not hinder the screen display of the external application as much as possible. However, the menu bar 220 is not limited to such a shape.

Furthermore, the menu 210 as illustrated in the lower part of FIG. 2 may be expanded by performing a tap operation on the menu bar 220. Further, the menu bar 220 is controlled by the control unit 190 to be in a non-display state by tapping an area other than the menu bar 220 on the display unit 150 or in a case where the menu bar 220 is not operated for a certain period of time. In this manner, the menu bar 220 is also controlled by the control unit 190 to be in the non-display state when not used by the user. As a result, the extension application can operate so as not to further interfere with the user operation on the external application and the OS, and the behavior of the external application.

A lower part of FIG. 4 illustrates a state in which the menu bar 220 displayed in the upper right portion of the display unit 150 is moved to an upper left portion of the display unit 150 by the user performing a drag and drop operation (an example of a first user input). As a result, the display position of the menu 210 is changed from the upper right portion (lower part in FIG. 2) to the upper left portion (an upper part in FIG. 5) on the display unit 150. Note that the display position of the menu 210 is not limited to the upper right portion or the upper left portion of the display unit 150.

In addition, the display position of the menu 210 changed in the lower part of FIG. 4 is stored in the storage unit 120 by the control unit 190, and thereafter, when the extension application is used, the menu 210 is displayed at the stored display position. Furthermore, the display position of the menu 210 may be stored in the storage unit 120 for each external application in association with the external application. As a result, when various external applications are used, it is not necessary to change the display position of the menu 210 according to the external application to be used each time.

Figure 5:
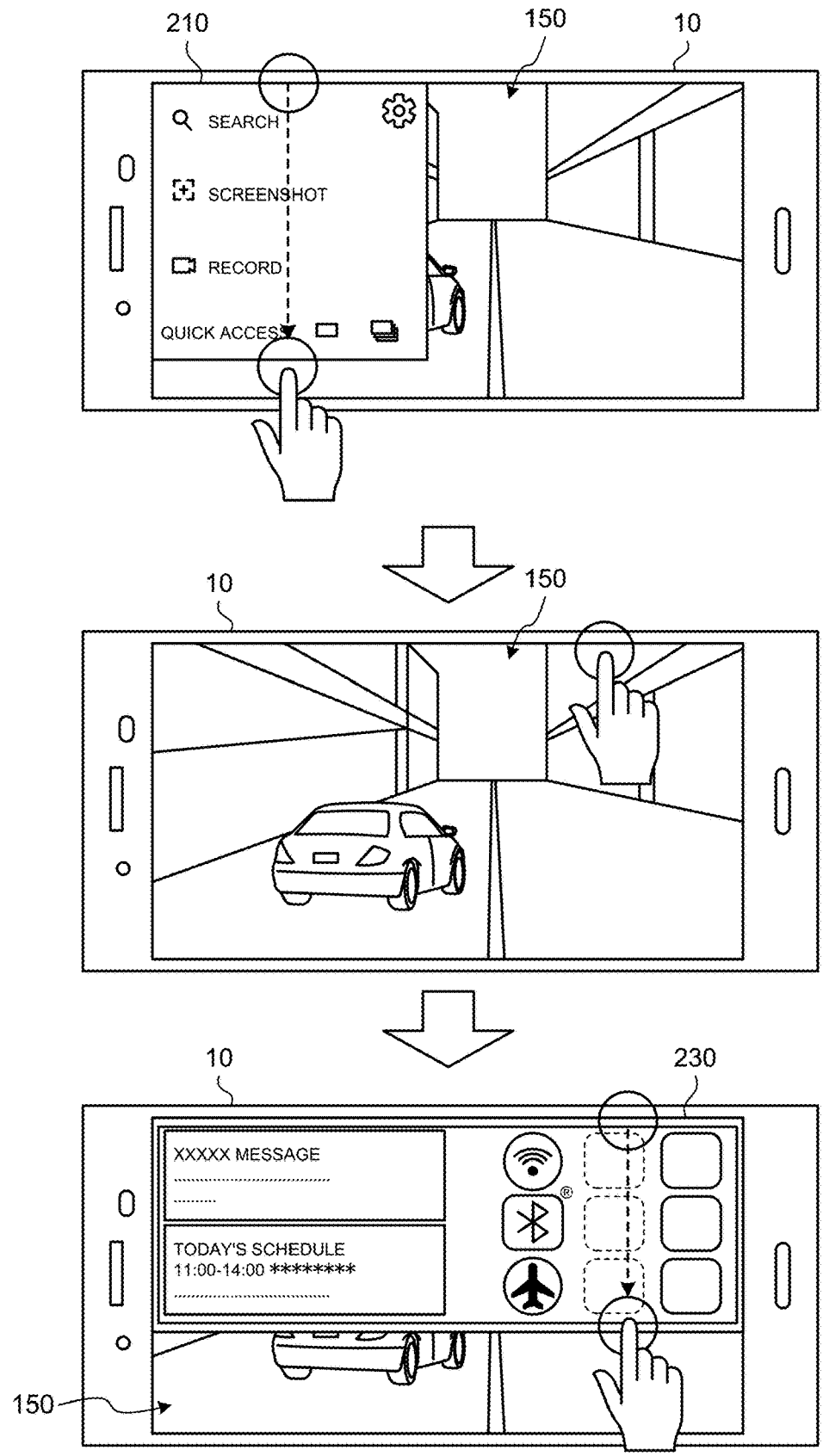
FIG. 5 is a diagram illustrating an example of an operation related to menu display of an extension application and an operating system (OS) according to the embodiment.

FIG. 5 is a diagram illustrating an example of an operation related to menu display of the extension application and the OS according to the present embodiment. The swipe operation from the screen end as illustrated in the upper part of FIG. 5 may also be used for menu display of the OS (That is, the menu 210 and an OS menu 230 are executed by the same operation.). In such a case, the control unit 190 performs control such that the menu 210 is preferentially displayed in the swipe operation at a predetermined position (the upper part of FIG. 5), and the OS menu 230 is displayed in the swipe operation at other positions (a middle part and a lower part of FIG. 5).

More specifically, for example, the OS menu 230 is originally displayed even when the swipe operation is performed from any position of an upper screen end on the display unit 150. However, in a case where the swipe operation from the upper left portion of the display unit 150 is set by the user to display the menu 210 (FIG. 4), the control unit 190 performs control to display the menu 210 preferentially (the upper part of FIG. 5). On the other hand, in the case of the swipe operation from the upper right portion of the display unit 150, the control unit 190 performs control to display the OS menu 230 (Lower part in FIG. 5. Strictly speaking, the control unit 190 performs control so as not to display the menu 210, and the display control of the OS menu 230 is left to the OS).

Note that, as a matter of course, in a case where the display position of the menu 210 is set in the upper right portion of the display unit 150, the control unit 190 performs control to display the menu 210 by the swipe operation from the upper right portion of the display unit 150 and display the OS menu 230 by the swipe operation from the upper left portion. Furthermore, in a case where the display position of the menu 210 is set to a position other than the upper portion of the display unit 150, the control unit 190 performs control to display the OS menu 230 regardless of the swipe operation performed from any position of the screen end at the upper portion of the display unit 150. As a result, the extension application can operate so as not to hinder the user operation on the OS.

Figure 6:
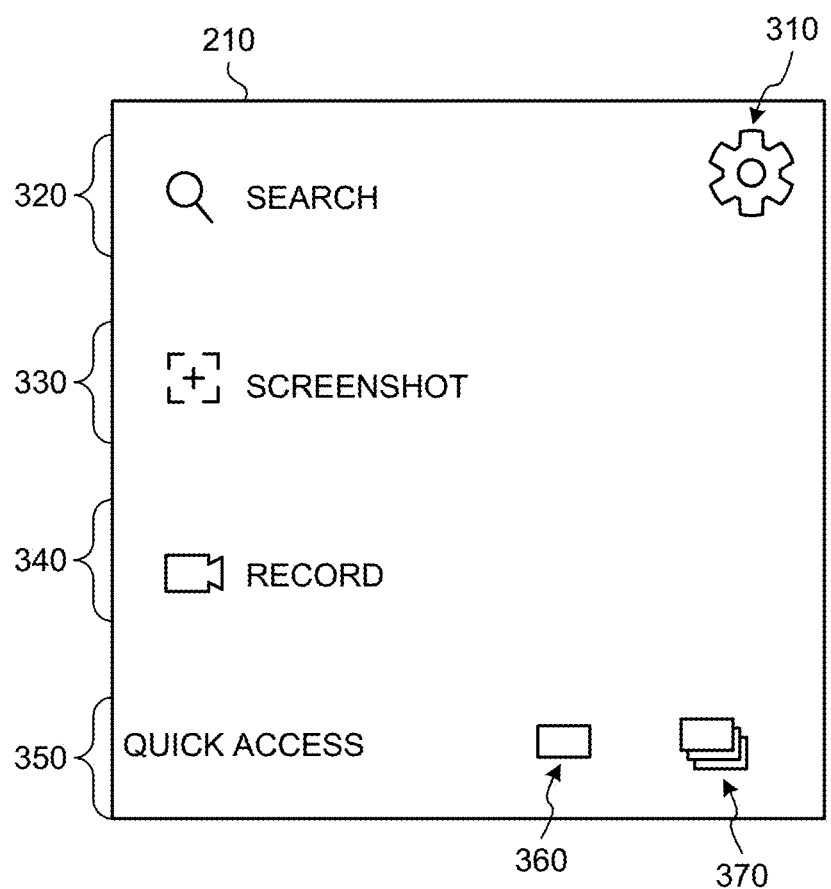
FIG. 6 is a diagram illustrating an example of a menu of an extension application according to the embodiment.

FIG. 6 is a diagram illustrating an example of a menu of the extension application according to the present embodiment. As illustrated in FIG. 6, the menu 210 of the extension application includes, for example, a menu setting change icon 310, a search function area 320, an SS function area 330, a record function area 340, a quick access area 350, an SS icon 360, and a continuous shooting SS icon 370.

The menu setting change icon 310 is an icon for changing settings related to the menu 210 and the menu bar 220. For example, when the user presses the menu setting change icon 310, a setting change screen (not illustrated) is displayed, and various changes can be made such that the display content of the menu 210, the type of the menu bar 220, and the menu bar 220 are always displayed.

The search function area 320, the SS function area 330, and the record function area 340 are areas for using various functions. When each area is pressed by the user, the control unit 190 displays a UI for using each function on the display unit 150. Various functions and UIs thereof will be described later.

The quick access area 350 is an area for immediately using various functions from the menu 210. In the example of FIG. 6, the quick access area 350 includes the SS icon 360 and the continuous shooting SS icon 370.

When the user presses the SS icon 360, the control unit 190 captures one screenshot (image) of the screen displayed on the display unit 150 via the screen capture unit 180, and stores the captured image in the storage unit 120.

When the continuous shooting SS icon 370 is pressed by the user, the control unit 190 continuously captures a plurality of screenshots of the screen displayed on the display unit 150 for a certain period of time (so-called burst mode shooting) via the screen capture unit 180. Then, the control unit 190 generates a data file in a GIF format or the like from the plurality of screenshots captured within the certain period of time, and stores the data file in the storage unit 120. As a result, it is possible to reduce a file size while maintaining a high frame per second (fps) as compared with a video file, and it is easy to grasp the decisive moment at the time of imaging even with a smartphone or the like.

Note that when the SS icon 360 or the continuous shooting SS icon 370 is pressed, the control unit 190 controls the menu 210 to be in a non-display state. As a result, it is possible to prevent the menu 210 from being included in the captured screenshots.

In addition, the display content of the menu 210 in FIG. 6 is an example, and is not limited thereto. It is possible to increase or decrease icons and areas for using various functions for providing extended functions to the external application, and change the arrangement thereof. Further, the shape, color, size, transmittance, and the like of the menu 210 are also examples.

Figure 7:
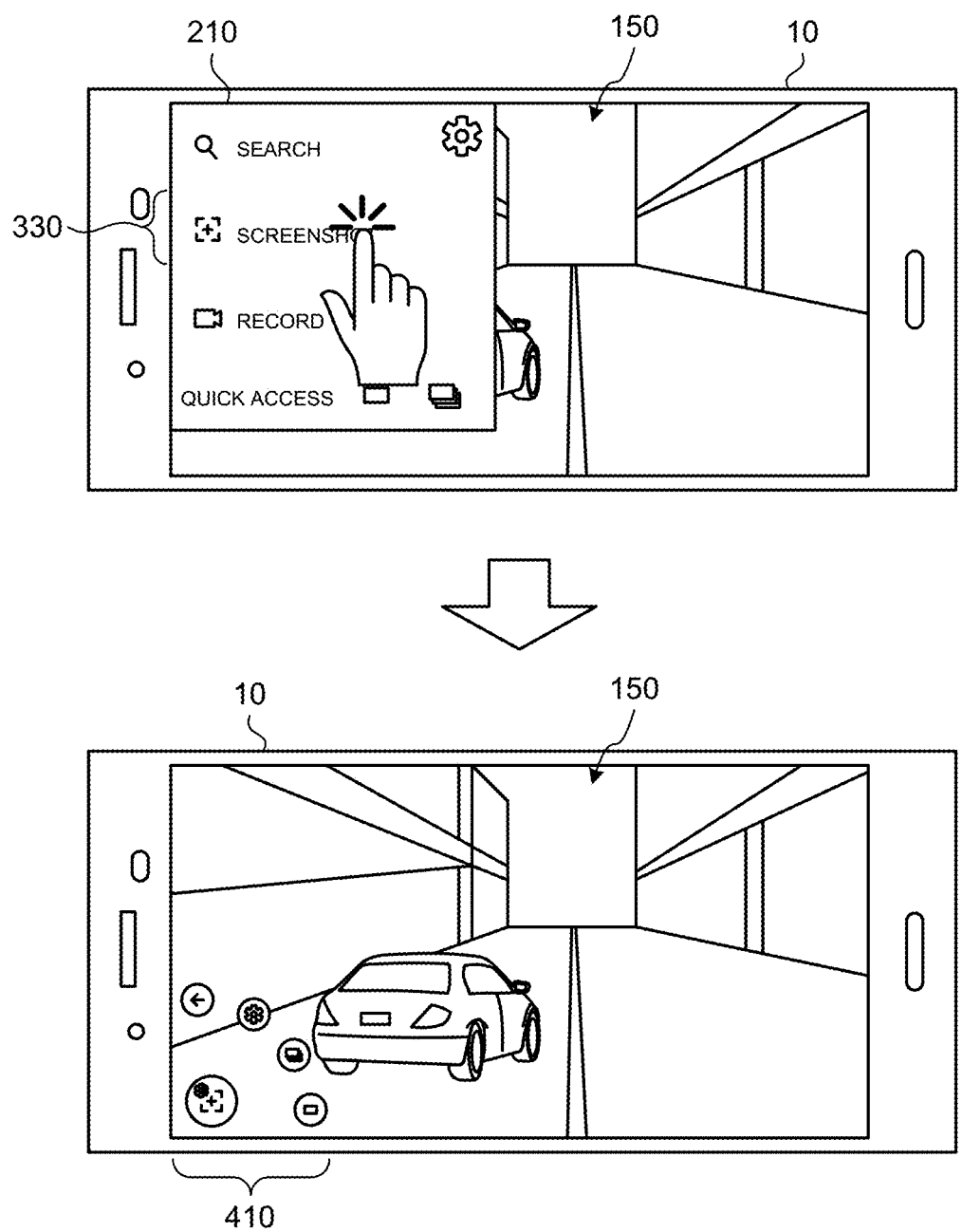
FIG. 7 is a diagram illustrating an example of an operation related to a screenshot function of an extension application according to the embodiment.

FIG. 7 is a diagram illustrating an example of an operation related to a screenshot function of the extension application according to the present embodiment. An upper part of FIG. 7 illustrates a state in which the user taps the SS function area 330 of the menu 210 displayed on the display unit 150 in order to use the screenshot function.

Subsequently, a lower part of FIG. 7 illustrates a state in which an SS menu 410 is superimposed and displayed on the external application when the user performs a tap operation on the SS function area 330. Furthermore, the menu 210 is controlled by the control unit 190 to be in a non-display state. Note that, in the example in the lower part of FIG. 7, the SS menu 410 is displayed in the lower left portion of the display unit 150, but the display position of the SS menu 410 can be freely changed by the user. The change of the display position of the SS menu 410 will be described later.

Figure 8:
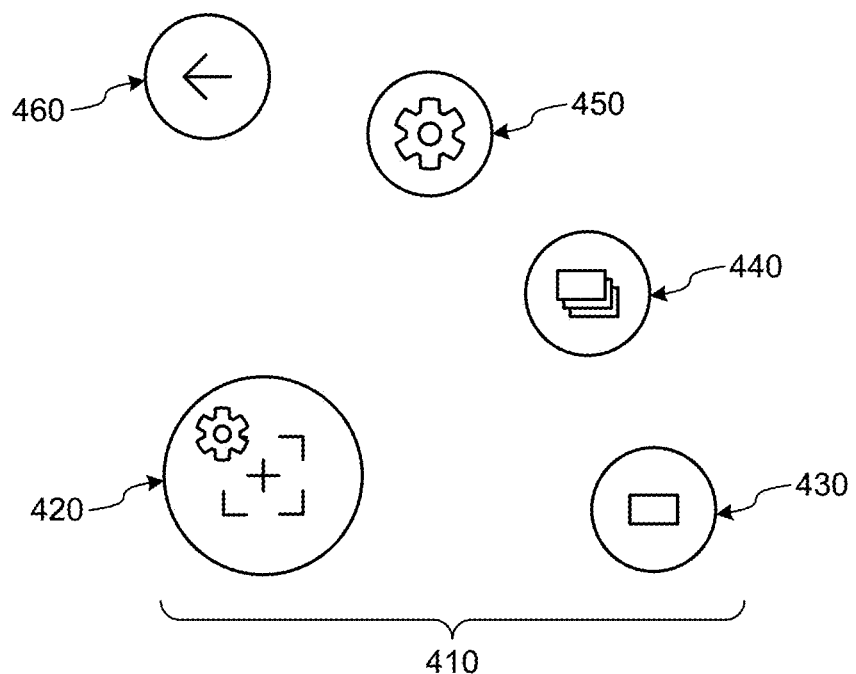
FIG. 8 is a diagram illustrating an example of a menu of a screenshot function according to the embodiment.

FIG. 8 is a diagram illustrating an example of a menu of the screenshot function according to the present embodiment. As illustrated in FIG. 8, the SS menu 410 includes, for example, an SS function icon 420, an SS icon 430, a continuous shooting SS icon 440, an SS function setting change icon 450, and a return icon 460.

Although described in detail later, the SS function icon 420 can change the display position of the SS menu 410 by being dragged and dropped by the user.

Similarly to the SS icon 360, when the user presses the SS icon 430, one screenshot of the screen displayed on the display unit 150 is captured and stored in the storage unit 120.

Similarly to the continuous shooting SS icon 370, when the user presses the continuous shooting SS icon 440, a plurality of screenshots of the screen displayed on the display unit 150 are captured in a burst mode and stored in the storage unit 120.

The SS function setting change icon 450 is an icon for changing the setting related to the SS function. For example, when the user presses the SS function setting change icon 450, a setting change screen (not illustrated) is displayed, and various changes (an example of a second user input) such as the continuous shooting time and the number of continuous shots during the burst mode can be performed.

When the user presses the return icon 460, the control unit 190 controls the SS menu 410 to be in a non-display state and the menu 210 to be displayed (That is, the state returns to the state in the upper part of FIG. 7.).

Note that the display content of the SS menu 410 in FIG. 8 is an example, and is not limited thereto. The number of icons for using various screenshot functions can be increased or decreased, or the arrangement thereof can be changed. In addition, shapes, colors, sizes, transmittances, and the like of various icons of the SS menu 410 are also examples.

Furthermore, an external application is displayed in an area other than the various icons of the SS menu 410, and the SS menu 410 is controlled by the control unit 190 so as not to hinder display and behavior of the external application as much as possible.

Figure 9:
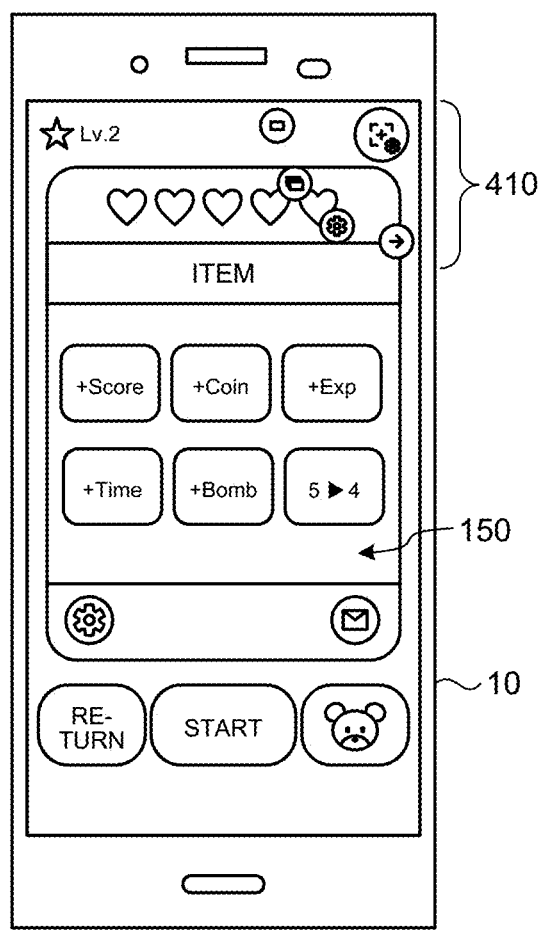
FIG. 9 is a diagram illustrating an example of a menu of a screenshot function according to the embodiment.

FIG. 9 is a diagram illustrating an example of a menu of the screenshot function according to the present embodiment. In FIG. 9, an external application for a vertical screen is displayed on the display unit 150. Also in the case of the vertical screen, similarly to the horizontal screen of FIG. 7, the menu 210 is displayed (FIG. 3), and when the SS function area 330 of the menu 210 is tapped, the SS menu 410 is displayed. Note that the SS menu 410 having a different arrangement of various icons and the like can be displayed on the vertical screen and the horizontal screen.

FIG. 10 is a diagram illustrating an example of an operation related to a change of a menu display position of the screenshot function according to the present embodiment. If the display position of the SS menu 410 is fixed, there is a case where a user operation on the external application or the OS and a behavior of the external application are significantly hindered.

Therefore, the display position of the SS menu 410 is controlled by the control unit 190 so as to be freely changed by the user.

An upper part of FIG. 10 illustrates a state in which the SS menu 410 is displayed in the lower left portion of the display unit 150. Next, as illustrated in a lower part of FIG. 10, a state is illustrated in which the SS function icon 420 in the SS menu 410 displayed in the lower left portion is moved to the lower right portion of the display unit 150 by the user performing a drag and drop operation. As a result, the display position of the SS menu 410 is changed from the lower left portion to the lower right portion of the display unit 150.

Note that the display position of the SS menu 410 is not limited to the lower left portion or the lower right portion of the display unit 150. Furthermore, in the example in the lower part of FIG. 10, the SS menu 410 is moved by the user operating the SS function icon 420, but for example, an icon other than the SS function icon 420 in the SS menu 410 may be dragged and dropped.

Figure 11:
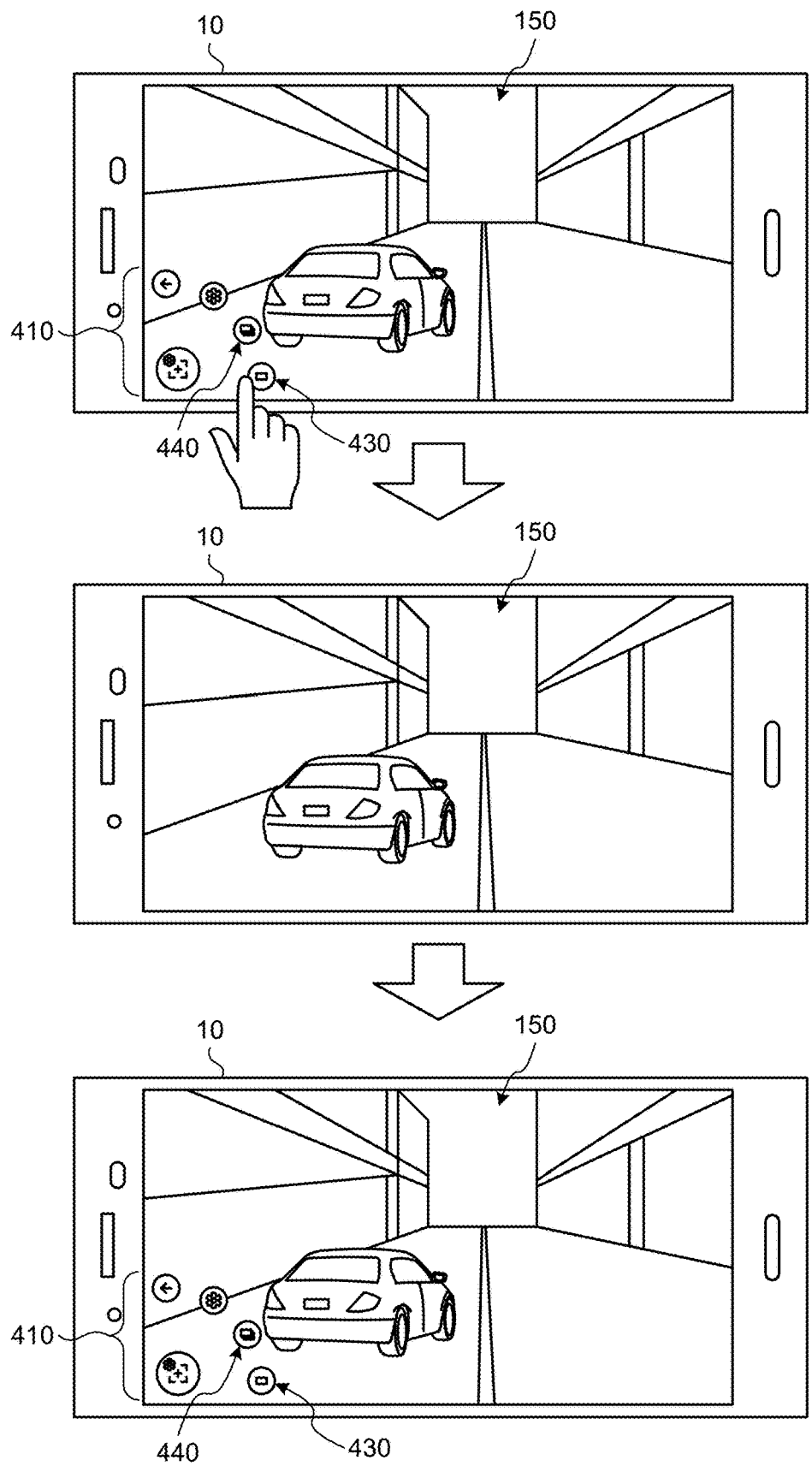
FIG. 11 is a diagram illustrating an example of an operation related to shooting of a screenshot function according to the embodiment.

FIG. 11 is a diagram illustrating an example of an operation related to shooting of the screenshot function according to the present embodiment. An upper part of FIG. 11 illustrates a state in which the user intends to press the SS icon 430 or the continuous shooting SS icon 440 in the SS menu 410 in order to capture a screenshot.

A middle part of FIG. 11 illustrates a state in which the user presses the SS icon 430 or the continuous shooting SS icon 440 and the screen capture unit 180 captures a screenshot. When the user presses the SS icon 430 or the continuous shooting SS icon 440, the control unit 190 brings the SS menu 410 into a non-display state. Then, the control unit 190 captures a screenshot of the screen displayed on the display unit 150 via the screen capture unit 180, and stores the captured screenshot in the storage unit 120. As illustrated in the middle part of FIG. 11, the control unit 190 controls the UI of the extension application such as the SS menu 410 not to be displayed during the capturing of the screenshot. As a result, it is possible to prevent the UI of the extension application from being reflected in the captured screenshot. Note that, at the start of the capturing of the screenshot, the control unit 190 can also perform control to output a voice or a sound for notifying the user of the start of the capturing via the voice output unit 170.

A lower part of FIG. 11 illustrates a state in which the capturing of the screenshot by the screen capture unit 180 is completed. When the capturing of the screenshot is completed, the control unit 190 performs control to display the SS menu 410 again. Alternatively, when the capturing of the screenshot is completed, the SS menu 410 may remain in a non-display state. Furthermore, at the time of completion of the capturing of the screenshot, the control unit 190 can also perform control to output, via the voice output unit 170, a voice or a sound for notifying the user of the completion of the capturing.

Figure 12:
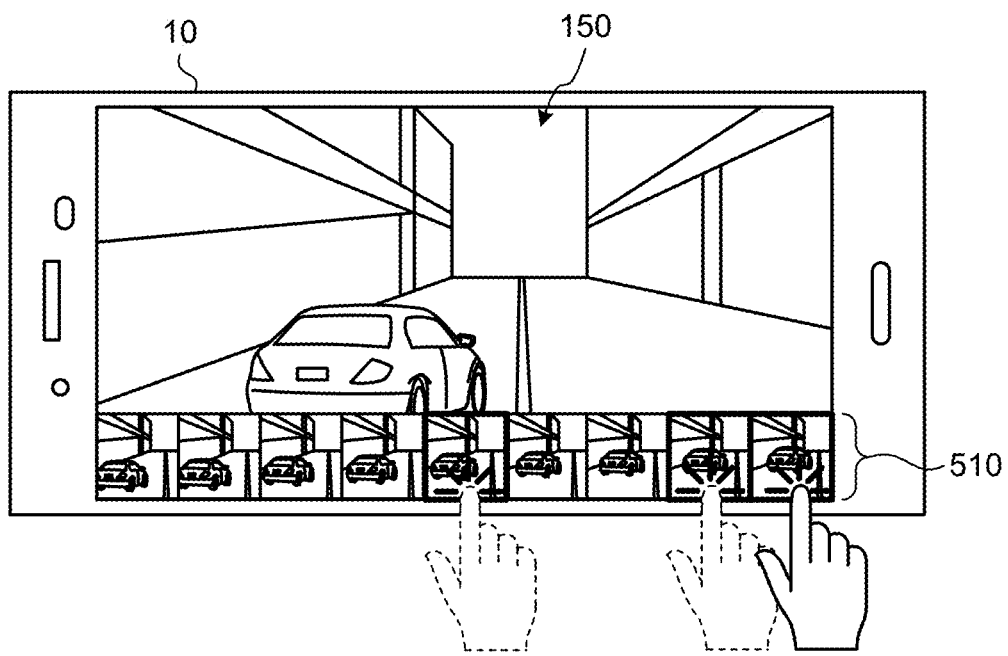
FIG. 12 is a diagram illustrating an example of an operation related to editing of a screenshot function according to the embodiment.

FIG. 12 is a diagram illustrating an example of an operation related to editing of the screenshot function according to the present embodiment. FIG. 12 illustrates a shooting result 510 by the burst mode shooting performed by pressing the continuous shooting SS icon 370 or the continuous shooting SS icon 440. In the shooting result 510, a plurality of screenshots captured in the burst mode are displayed side by side in time series from left to right. As illustrated in FIG. 12, the user can select an arbitrary image from the shooting result 510 by a tap operation (an example of a fourth user input) or the like. The control unit 190 generates a data file in a GIF format or the like from the selected image, and stores the data file in the storage unit 120. In addition, an unnecessary image may be selected from the shooting result 510, and a data file may be generated from the remaining images. Furthermore, an arbitrary image can be replaced by a drag and drop operation, or an arrangement order of the screenshots can be changed. Further, an image that cannot be displayed in the shooting result 510 can be displayed by horizontally scrolling the images arranged in time series by a flick operation by the user in a predetermined area of the shooting result 510, for example. In this manner, the user can create a favorite GIF animation image or the like by editing a plurality of screenshots captured in the burst mode.

Figure 13:
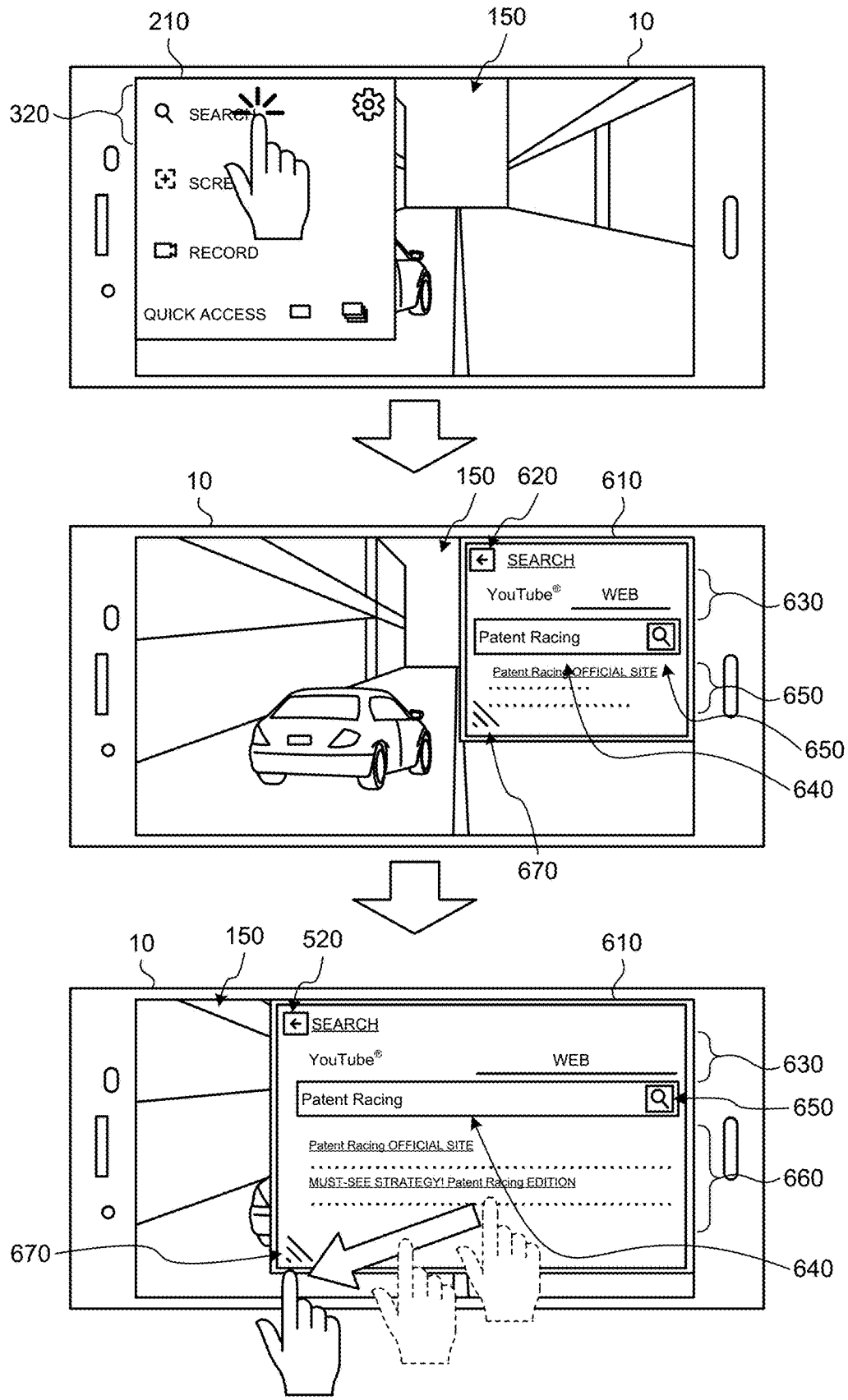
FIG. 13 is a diagram illustrating an example of an operation related to a search function of an extension application according to the embodiment.

FIG. 13 is a diagram illustrating an example of an operation related to a search function of the extension application according to the present embodiment. The search function is a function for executing a search for a video site or a search engine on the basis of a search word while using an external application. An upper part of FIG. 13 illustrates a state in which the user taps the search function area 320 of the menu 210 displayed on the display unit 150 in order to use the search function.

Subsequently, a middle part of FIG. 13 illustrates a state in which a search menu 610 is displayed to be superimposed on an external application when the user performs a tap operation on the search function area 320. Furthermore, the menu 210 is controlled by the control unit 190 to be in a non-display state. Note that, in the example in the middle part of FIG. 13, the search menu 610 is displayed in the lower left portion of the display unit 150, but the display position of the search menu 610 can be freely changed by the user.

As illustrated in the middle part of FIG. 13, the search menu 610 includes a return icon 620, a search destination selection area 630, a search box 640, a search button 650, a search result 660, and a size change icon 670.

When the return icon 620 is pressed by the user, the search menu 610 is brought into a non-display state, and the control unit 190 controls to display the menu 210 (That is, the state returns to the state in the upper part of FIG. 13.). Alternatively, when the user performs a tap operation or the like on an area other than the search menu 610, the search menu 610 can be brought into a non-display state, and the menu 210 can be displayed.

In the search destination selection area 630, the names of searchable video sites and search engines are displayed, and the user can select a search destination by a tap operation or the like. Note that any search destination may be initially set at the stage of displaying the search menu 610. In addition, the search destination to be initially set can be selected by the user in advance and stored in the storage unit 120. Further, the search destination to be initially set may be stored in the storage unit 120 for each external application in association with the external application. This eliminates the need to select a search destination each time when using various external applications. Furthermore, the selection frequency and the use frequency of the search destination are stored in the storage unit 120 for each external application, and the search destination with the highest selection frequency and use frequency can be initially set for the external application.

The search box 640 is an area for inputting a search word for the search destination selected in the search destination selection area 630. Note that, in a case where the user uses a search function of the extension application as illustrated in FIG. 13, there is an extremely high possibility that the user searches for information regarding the external application. Therefore, when the search menu 610 is displayed, a title of the external application and the like can be initially set in the search box 640. As a result, an input load of the user can be reduced.

The search button 650 is a button for executing a search for a video site or a search engine on the basis of the search word. When the search button 650 is pressed by the user, the control unit 190 performs a search with the search word input in the search box 640 with respect to the search destination selected in the search destination selection area 630. Note that a search similar to the search using the search button 650 can also be executed by a tap operation of the user on an input area of the search box 640.

The search result 660 is an area indicating a search result obtained by searching the search destination selected in the search destination selection area 630 with the search word input in the search box 640. When the search destination is a video site, thumbnails, link destinations, and the like of searched and hit videos are displayed in a list form in the search result 660. On the other hand, when the search destination is a search engine, link destinations, and the like of searched and hit sites are displayed in a list form. Note that, when the search menu 610 is displayed, it is also possible to initially display a search destination that is initially set and a search result by a search word. In addition, in order to display a search result that cannot be displayed in the search result 660, for example, when the user performs a flick operation in a predetermined area of the search result 660, the display of the search result 660 can be scrolled up and down.

As illustrated in a lower part of FIG. 13, the size change icon 670 allows the user to freely change the size of the search menu 610 by a drag and drop operation. As a result, as illustrated in the lower part of FIG. 13, an amount of information that can be displayed in the search menu 610 can be increased.

Note that search menu 610 is merely one of functions of the extension application, and does not display an existing browser by a picture-in-picture function. Various settings such as a size and a display position of the search menu 610, and search results are stored as held data in the storage unit 120. Therefore, even when the search menu 610 is temporarily closed and redisplayed, the control unit 190 can read the held data from the storage unit 120, and display the search menu 610 in the state when it was closed. Furthermore, such held data can be stored in the storage unit 120 for each external application in association with the external application. As a result, even when the user erroneously or intentionally closes the search menu 610, it is possible to avoid a problem that various settings set by the user and search results are reset.

Note that the display content of the search menu 610 in the middle and lower parts of FIG. 13 is an example, and is not limited thereto. It is possible to increase or decrease icons and areas for using various search functions and change an arrangement thereof. In addition, shapes, colors, sizes, transmittances, and the like of various icons and areas of the search menu 610 are also examples.

Figure 14:
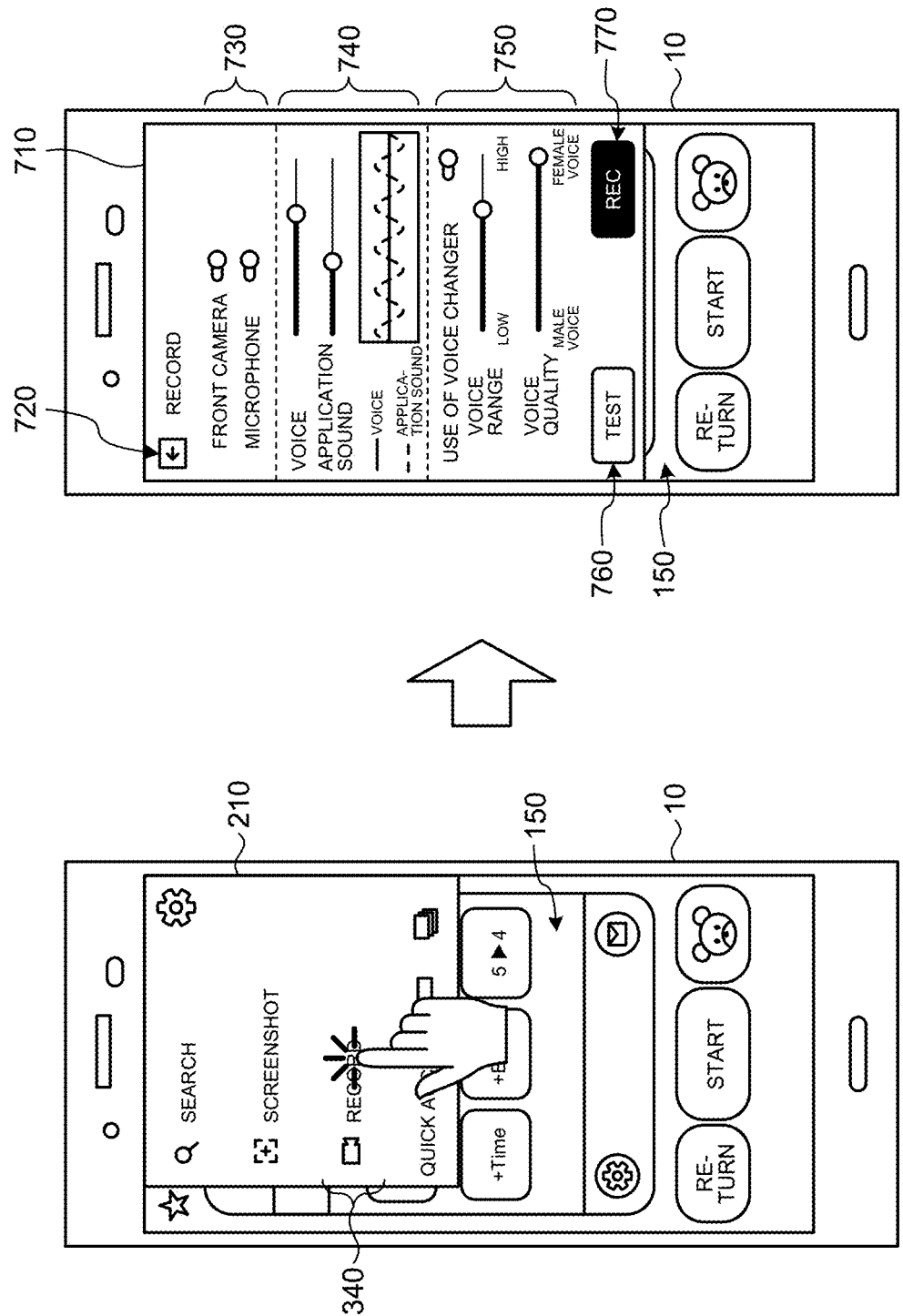
FIG. 14 is a diagram illustrating an example of an operation related to a record function of an extension application according to the embodiment.

FIG. 14 is a diagram illustrating an example of an operation related to a record function of the extension application according to the present embodiment. The record function is a function for recording a play video of the external application for distribution. Note that the play video is synthesized with a user imaged by the imaging unit 130, a user's voice collected by the voice input unit 160, or the like, and recorded.

A left side of FIG. 14 illustrates a state in which the user taps the record function area 340 of the menu 210 displayed on the display unit 150 in order to use the record function.

Subsequently, a right side of FIG. 14 illustrates a state in which a record menu 710 is superimposed and displayed on an external application when the user performs a tap operation on the record function area 340. Furthermore, the menu 210 is controlled to be in a non-display state by the control unit 190. Note that the display position of the record menu 710 can be freely changed by the user.

As illustrated on the right side of FIG. 14, the record menu 710 includes a return icon 720, an input setting area 730, an output setting area 740, a voice changer setting area 750, a test button 760, and a recording button 770.

When the return icon 720 is pressed by the user, the record menu 710 is brought into a non-display state, and the control unit 190 controls to display the menu 210 (That is, the state returns to the state on the left side of FIG. 14.). Alternatively, when the user performs a tap operation or the like on an area other than the record menu 710, the record menu 710 can be brought into a non-display state to display the menu 210.

The input setting area 730 is an area for performing an ON/OFF setting of the front camera that images the user and the microphone that collects a voice of the user.

The output setting area 740 is an area for adjusting an output sound volume of the voice collected by the microphone or an application sound (a volume of the external application). The output sound volume adjusted in the output setting area 740 is various sound volumes recorded by the record function. It is also possible to display an output balance between the voice and the application sound. Note that the output sound volume in the output setting area 740 can be adjusted independently of the output sound volume in the OS. For example, the application sound output by the voice output unit 170 of the information processing apparatus 10 can be adjusted to a relatively large volume, and the application sound recorded by the record function can be adjusted to a volume small enough to hear the user's voice.

The voice changer setting area 750 is an area for an ON/OFF setting of voice changer use, and adjusting a voice range and a voice quality of a voice collected by the microphone.

The test button 760 is a button for recording and reproducing the voice collected by the microphone and the application sound based on the content set in the record menu 710. For example, when the test button 760 is pressed by the user, the voice of the user or the application sound is temporarily recorded for a certain period of time, and then the recorded voice or application sound is reproduced. Note that the voice and the application sound to be reproduced are adjusted on the basis of the content set in the record menu 710. As a result, the user can actually check the volume balance of the voice and the application sound recorded by the record function, and can readjust the content set in the record menu 710.

The recording button 770 is a button for recording the play video of the external application. For example, when the recording button 770 is pressed by the user, the control unit 190 sets the record menu 710 to a non-display state, starts video capturing of the screen displayed on the display unit 150 via the screen capture unit 180, and stores the captured video in the storage unit 120. At this time, the video may be synthesized and recorded with the image of the user imaged by the imaging unit 130 or the voice of the user collected by the voice input unit 160.

2. Modification of Embodiment

Figure 15:
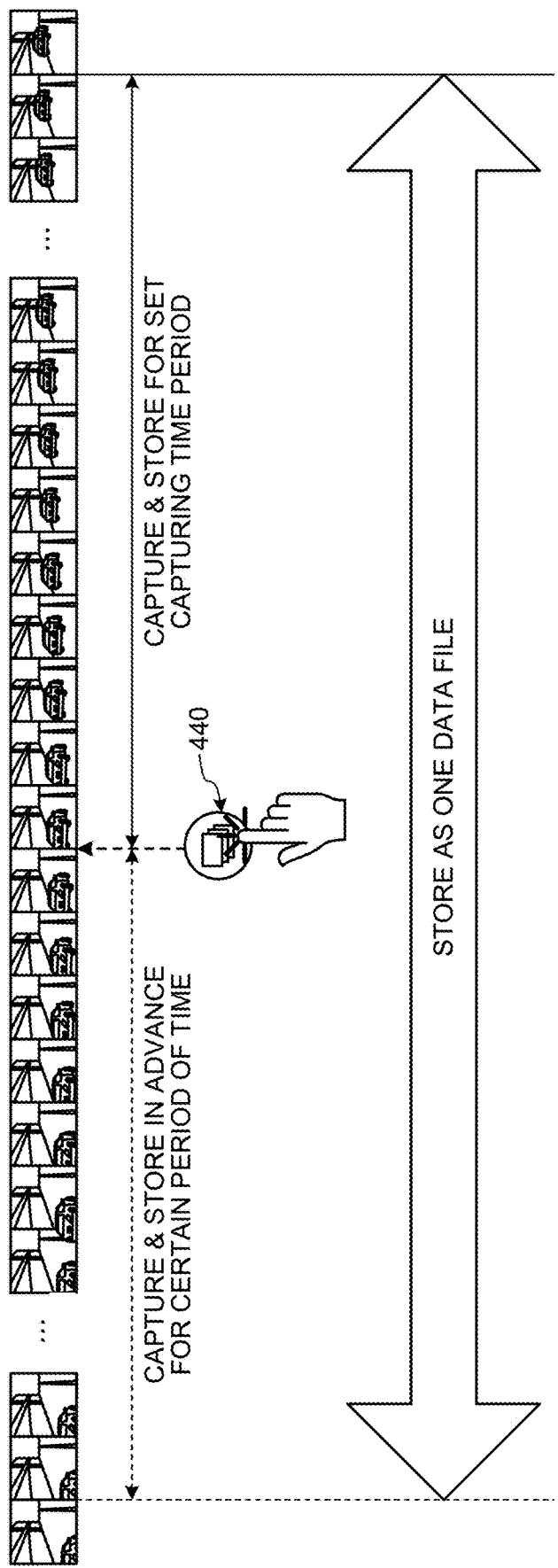
FIG. 15 is a diagram illustrating a modification of a screenshot function according to the embodiment.

FIG. 15 is a diagram illustrating a modification of a screenshot function according to the present embodiment. As described in FIG. 8 and the like, when the continuous shooting SS icon 440 (or the continuous shooting SS icon 370) is pressed by the user, the control unit 190 continuously captures a plurality of screenshots of the screen displayed on the display unit 150 for a certain period of time.

However, in order to capture a screenshot, various menus are displayed, and a scene desired to be captured may be missed while the continuous shooting SS icon 440 is pressed. Therefore, as illustrated in FIG. 15, screenshots are captured and stored in advance for a certain period of time, and are stored as one data file together with the screenshots captured by pressing the continuous shooting SS icon 440 (an example of a third user input).

The start at the time of capturing in advance may be at the time of activation of the extension application, but it is desirable to use an arbitrary operation as a trigger in consideration of performance, resources, and the like of the information processing apparatus 10. The arbitrary operation is, for example, a user operation detected by the operation unit 110 or the sensor unit 140, a voice operation recognized by the voice input unit 160, or the like. In addition, if the previously-stored screenshots are retained endlessly, the data capacity of the storage unit 120 may be compressed, so that old screenshots are sequentially deleted.

Figure 16:
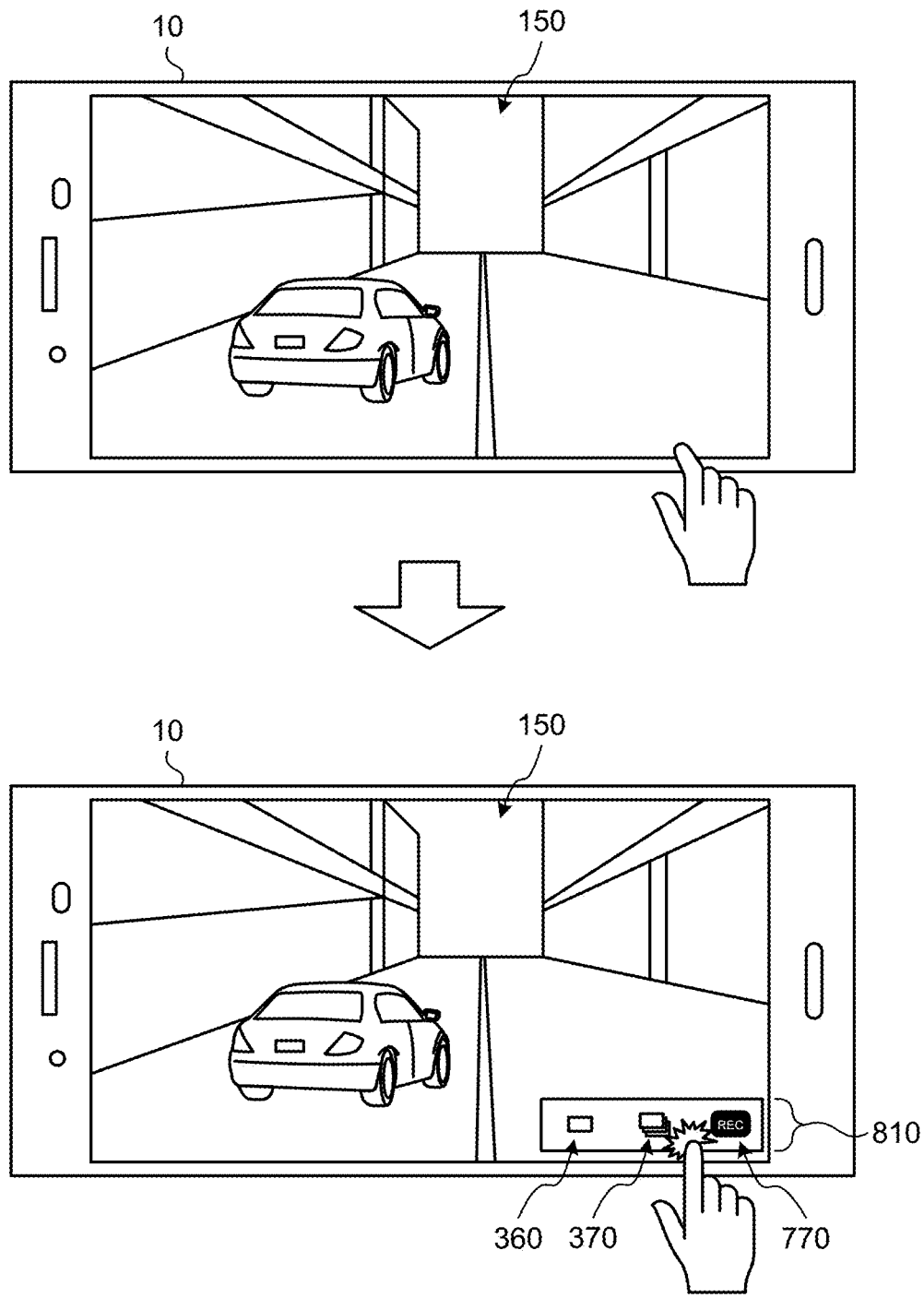
FIG. 16 is a diagram illustrating a modification of a menu of an extension application of the embodiment.

FIG. 16 is a diagram illustrating a modification of a menu of the extension application of the present embodiment. An upper part of FIG. 16 illustrates a state in which the user performs a flick operation on a predetermined position of the display unit 150 in order to display a quick access menu 810.

Subsequently, a lower part of FIG. 16 illustrates a state in which the quick access menu 810 is superimposed and displayed on the external application by the user performing a flick operation. The quick access menu 810 includes the SS icon 360, the continuous shooting SS icon 370, and the recording button 770. By pressing various icons from the quick access menu 810, the user can more quickly capture a video or an image of a play screen of the external application.

Note that a touch operation for displaying the quick access menu 810, a predetermined position of the display unit 150, a display position of the quick access menu 810, and the like can be freely changed by the user. Furthermore, the display content of the quick access menu 810 is an example, and is not limited thereto. The number of icons for quick access can be increased or decreased, or an arrangement thereof can be changed. In addition, the shape, color, size, transmittance, and the like of the quick access menu 810 are also examples.

<3. Hardware Configuration Example>

Figure 17:
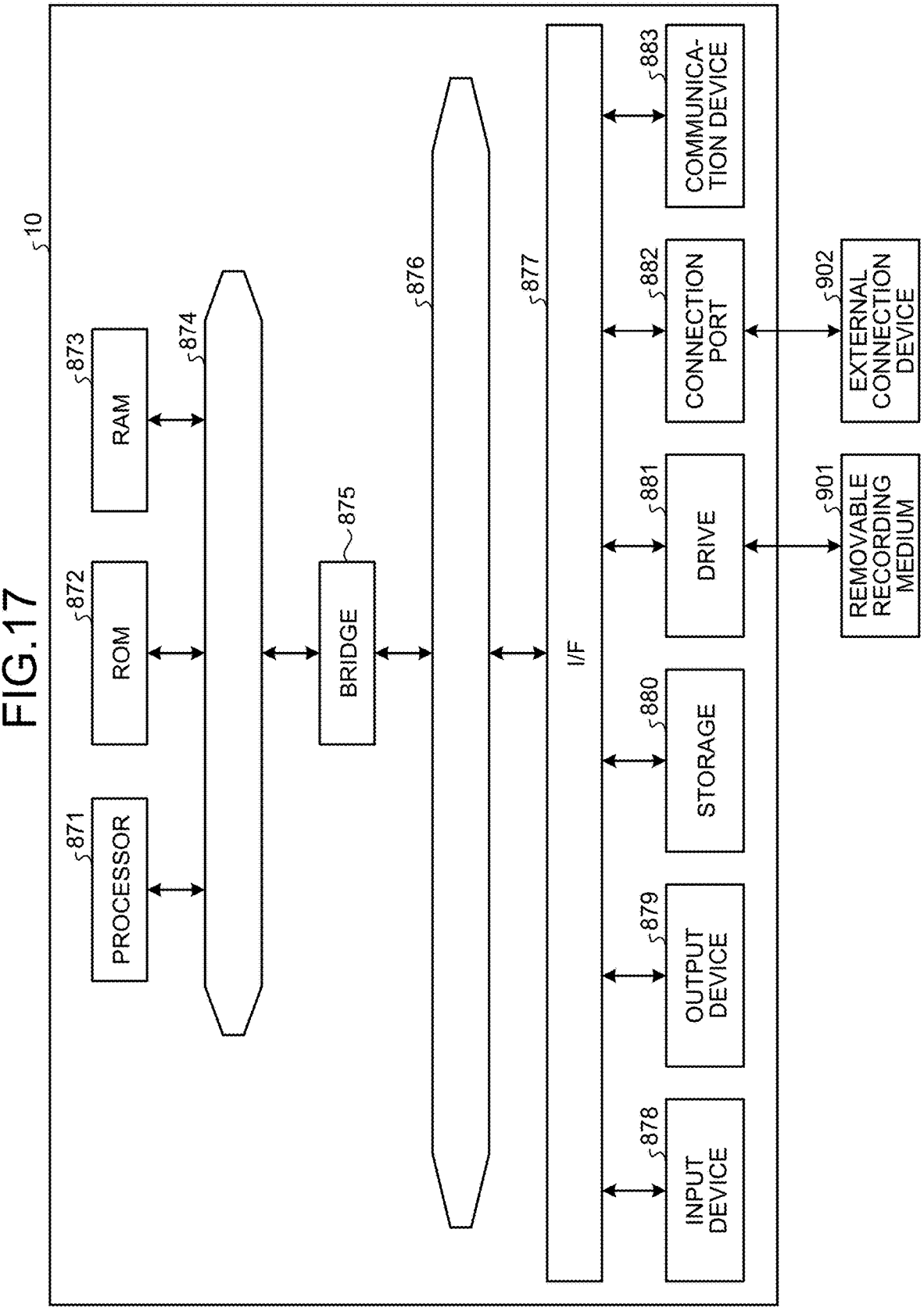
FIG. 17 is a block diagram illustrating a hardware configuration example of the information processing apparatus 10 according to the embodiment of the present disclosure.

Next, a hardware configuration example of the information processing apparatus 10 according to the embodiment of the present disclosure will be described. FIG. 17 is a block diagram illustrating a hardware configuration example of the information processing apparatus 10 according to the embodiment of the present disclosure. Referring to FIG. 17, the information processing apparatus 10 includes, for example, a processor 871, a ROM 872, a RAM 873, a host bus 874, a bridge 875, an external bus 876, an interface 877, an input device 878, an output device 879, a storage 880, a drive 881, a connection port 882, and a communication device 883. Note that the hardware configuration illustrated here is an example, and some of the components may be omitted. In addition, components other than the components illustrated here may be further included.

(Processor 871)

The processor 871 functions as, for example, an arithmetic processing device or a control device, and controls an overall operation of each component or a part thereof on the basis of various programs recorded in the ROM 872, the RAM 873, the storage 880, or a removable recording medium 901.

(ROM872, RAM873)

The ROM 872 is a unit that stores a program read by the processor 871, data used for calculation, and the like. The RAM 873 temporarily or permanently stores, for example, a program read by the processor 871, various parameters that appropriately change when the program is executed, and the like.

(Host bus 874, bridge 875, external bus 876, interface 877)

The processor 871, the ROM 872, and the RAM 873 are mutually connected via, for example, the host bus 874 capable of high-speed data transmission. On the other hand, the host bus 874 is connected to the external bus 876 having a relatively low data transmission speed via the bridge 875, for example. In addition, the external bus 876 is connected to various components via the interface 877.

(Input Device 878)

As the input device 878, for example, a mouse, a keyboard, a touch panel, a button, a switch, a lever, and the like are used. Furthermore, as the input device 878, a remote controller (hereinafter, remote controller) capable of transmitting a control signal using infrared rays or other radio waves may be used. Further, the input device 878 includes a voice input device such as a microphone.

(Output Device 879)

The output device 879 is a device capable of visually or audibly notifying the user of acquired information, for example, a display device such as a cathode ray tube (CRT), an LCD, or an organic EL, an audio output device such as a speaker or a headphone, a printer, a mobile phone, a facsimile, or the like. Furthermore, the output device 879 according to the present disclosure includes various vibration devices capable of outputting tactile stimulation.

(Storage 880)

The storage 880 is a device for storing various data. As the storage 880, for example, a magnetic storage device such as a hard disk drive (HDD), a semiconductor storage device, an optical storage device, a magneto-optical storage device, or the like is used.

(Drive 881)

The drive 881 is, for example, a device that reads information recorded in the removable recording medium 901 such as a magnetic disk, an optical disk, a magneto-optical disk, or a semiconductor memory, or writes information to the removable recording medium 901.

(Removable Recording Medium 901)

The removable recording medium 901 is, for example, a DVD medium, a Blu-ray (registered trademark) medium, an HD DVD medium, various semiconductor storage media, or the like. Of course, the removable recording medium 901 may be, for example, an IC card on which a non-contact IC chip is mounted, an electronic device, or the like.

(Connection Port 882)

The connection port 882 is a port for connecting an external connection device 902 such as a universal serial bus (USB) port, an IEEE 1394 port, a small computer system interface (SCSI), an RS-232C port, or an optical audio terminal.

(External Connection Device 902)

The external connection device 902 is, for example, a printer, a portable music player, a digital camera, a digital video camera, an IC recorder, or the like.

(Communication Device 883)

The communication device 883 is a communication device for connecting to a network, and is, for example, a communication card for wired or wireless LAN, Bluetooth (registered trademark), or wireless USB (WUSB), a router for optical communication, a router for asymmetric digital subscriber line (ADSL), a modem for various communications, or the like.

<4. Summary>

As described above, the program causes the information processing apparatus (10) to:

activate a second application that provides an extended function to a first application;

superimpose and display a menu of the second application on the first application in response to a predetermined operation at a predetermined position on a screen (the display unit 150 of the information processing apparatus 10) where the first application is displayed and the second application is not displayed; and execute processing corresponding to the extended function selected from the menu 210.

This makes it possible to provide a more comfortable user experience without disturbing the display and operation of each other's applications as much as possible when using other applications so as to extend one application.

Although the preferred embodiments of the present disclosure have been described in detail with reference to the accompanying drawings, the technical scope of the present disclosure is not limited to such examples. It is obvious that a person having ordinary knowledge in the technical field of the present disclosure can conceive various changes or modifications within the scope of the technical idea described in the claims, and it is naturally understood that these also belong to the technical scope of the present disclosure.

Furthermore, the effects described in the present specification are merely illustrative or exemplary, and are not restrictive. That is, the technology according to the present disclosure can exhibit other effects obvious to those skilled in the art from the description of the present specification together with or instead of the above effects.

Note that the present technology can also have the following configurations.

(1) A program causing an information processing apparatus to:
activate a second application that provides an extended function to a first application;
superimpose and display a menu of the second application on the first application in response to a predetermined operation at a predetermined position on a screen where the first application is displayed and the second application is not displayed; and
execute processing corresponding to the extended function selected from the menu.

(2) The program according to claim 1, wherein the predetermined position is predetermined based on a first user input.

(3) The program according to claim 1, wherein the predetermined operation is a swipe operation, and the menu is a pull-down menu.

(4) The program according to claim 3, wherein the swipe operation is an operation from a screen end, and the pull-down menu is expanded from the screen end.

(5) The program according to claim 1, wherein to superimpose and display the menu is executed in preference to an operation of an operating system of the information processing apparatus, the operation being executed by an operation same as the predetermined operation at the predetermined position.

(6) The program according to claim 1, wherein the extended function includes at least a screenshot capturing function.

(7) The program according to claim 6, wherein the menu is in a non-display state during capturing by the screenshot capturing function.

(8) The program according to claim 6, wherein continuous shooting time and/or the number of continuous shots of the screenshot capturing function are/is determined based on a second user input.

(9) The program according to claim 8, causing the information processing apparatus to:
further execute processing of performing capturing by the screenshot capturing function in advance, and storing, as one data file, a plurality of captured images from a certain period of time before a third user input is made to after elapse of the continuous shooting time from time when the third user input is made.

(10) The program according to claim 6, causing the information processing apparatus to:
further execute processing of storing, as one data file, one or more images selected based on a fourth user input from a plurality of images captured by the screenshot capturing function.

(11) An information processing apparatus comprising a control unit that:
activates a second application that provides an extended function to a first application;
superimposes and displays a menu of the second application on the first application in response to a predetermined operation at a predetermined position on a screen where the first application is displayed and the second application is not displayed; and
executes processing corresponding to the extended function selected from the menu.

(12) A method in which an information processing apparatus:
activates a second application that provides an extended function to a first application;
superimposes and displays a menu of the second application on the first application in response to a predetermined operation at a predetermined position on a screen where the first application is displayed and the second application is not displayed; and
executes processing corresponding to the extended function selected from the menu.

REFERENCE SIGNS LIST

10 INFORMATION PROCESSING APPARATUS
110 OPERATION UNIT
120 STORAGE UNIT
130 IMAGING UNIT
140 SENSOR UNIT
150 DISPLAY UNIT
160 VOICE INPUT UNIT
170 VOICE OUTPUT UNIT
180 SCREEN CAPTURE UNIT
190 CONTROL UNIT

The invention claimed is:

1. A non-transitory computer readable medium including executable instructions, which when executed by an information processing apparatus cause the information processing apparatus to:
activate a second application that provides an extended function to a first application;
superimpose and display a menu of the second application on the first application in response to a predetermined operation at a predetermined position on a screen where the first application is displayed and the second application is not displayed; and
execute processing corresponding to the extended function selected from the menu, wherein
the first application has a function of displaying, on the information processing apparatus, a video,
the extended function includes a function of recording the video of the first application, and
the extended function includes another function of recording the video of the first application, while recording another video using a camera of the information processing apparatus, and synthesizing the video of the first application with the other video.

2. The non-transitory computer readable medium according to claim 1, wherein the predetermined position is predetermined based on a first user input.

3. The non-transitory computer readable medium according to claim 1, wherein the predetermined operation is a swipe operation, and the menu is a pull-down menu.

4. The non-transitory computer readable medium according to claim 3, wherein the swipe operation is an operation from a screen end, and the pull-down menu is expanded from the screen end.

5. The non-transitory computer readable medium according to claim 1, wherein to superimpose and display the menu is executed in preference to an operation of an operating system of the information processing apparatus, the operation being executed by an operation same as the predetermined operation at the predetermined position.

6. The non-transitory computer readable medium according to claim 1, wherein the extended function includes at least a screenshot capturing function.

7. The non-transitory computer readable medium according to claim 6, wherein the menu is in a non-display state during capturing by the screenshot capturing function.

8. The non-transitory computer readable medium according to claim 6, wherein continuous shooting time and/or the number of continuous shots of the screenshot capturing function are/is determined based on a second user input.

9. The non-transitory computer readable medium according to claim 8, the executable instructions causing the information processing apparatus to:
further execute processing of performing capturing by the screenshot capturing function in advance, and storing, as one data file, a plurality of captured images from a certain period of time before a third user input is made to after elapse of the continuous shooting time from time when the third user input is made.

10. The non-transitory computer readable medium according to claim 6, the executable instructions causing the information processing apparatus to:
further execute processing of storing, as one data file, one or more images selected based on a fourth user input from a plurality of images captured by the screenshot capturing function.

11. An information processing apparatus comprising:
processing circuitry configured to activate a second application that provides an extended function to a first application;
superimpose and display a menu of the second application on the first application in response to a predetermined operation at a predetermined position on a screen where the first application is displayed and the second application is not displayed; and
execute processing corresponding to the extended function selected from the menu, wherein
the first application has a function of displaying, on the information processing apparatus, a video,
the extended function includes a function of recording the video of the first application, and
the extended function includes another function of recording the video of the first application, while recording another video using a camera of the information processing apparatus, and synthesizing the video of the first application with the other video.

12. A method comprising:
activating, using processing circuitry of information processing apparatus, a second application that provides an extended function to a first application;
superimposing and displaying, using the processing circuitry, a menu of the second application on the first application in response to a predetermined operation at a predetermined position on a screen where the first application is displayed and the second application is not displayed; and
executing, using the processing circuitry, processing corresponding to the extended function selected from the menu, wherein
the first application has a function of displaying, on the information processing apparatus, a video, the extended function includes a function of recording the video of the first application, and
the extended function includes another function of recording the video of the first application, while recording another video using a camera of the information processing apparatus, and synthesizing the video of the first application with the other video.

* * * * *